United States Patent [19]

Shaffer et al.

[11] Patent Number: 6,021,114
[45] Date of Patent: Feb. 1, 2000

[54] METHOD AND SYSTEM FOR UTILIZING COMMUNICATIONS LINES

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 08/844,418

[22] Filed: Apr. 18, 1997

[51] Int. Cl.[7] .............................. G01R 31/08; H04J 3/16
[52] U.S. Cl. ............................................. 370/232; 370/468
[58] Field of Search ..................................... 370/468, 465, 370/528, 437, 352, 353, 232, 233, 234, 493, 428, 230, 433, 434; 379/93.09, 100.15

[56] References Cited

U.S. PATENT DOCUMENTS

| | | | |
|---|---|---|---|
| 4,629,830 | 12/1986 | Daisenberger | 340/825.03 |
| 5,214,688 | 5/1993 | Szlam et al. | 379/67 |
| 5,392,280 | 2/1995 | Zheng | 370/253 |
| 5,444,707 | 8/1995 | Cerna et al. | 370/468 |
| 5,507,006 | 4/1996 | Knight | 370/493 |
| 5,673,253 | 9/1997 | Shaffer | 370/468 |
| 5,774,455 | 6/1998 | Kawase et al. | 370/468 |

*Primary Examiner*—Chau Nguyen
*Assistant Examiner*—Phuong Chau Ba Nguyen

[57] ABSTRACT

A method and system for utilizing a plurality of communications lines includes establishing a connection between a messaging system, a communications switch, and a plurality of communications lines. The messaging system has the ability to store files of data for transmission via the communications switch and the communications lines. The communications switch controls the flow of data files to the communications lines. Data traffic through the communications lines is monitored and the data traffic level is compared to an established data traffic threshold. Data files are transmitted from the messaging system to the communications lines if the measured data traffic level is below the data traffic threshold. The method and system may be used to efficiently utilize a leased telecommunications trunk line.

18 Claims, 3 Drawing Sheets

METHOD AND SYSTEM FOR UTILIZING COMMUNICATIONS LINES

BACKGROUND OF THE INVENTION

The invention relates to telecommunications and more particularly to a device and method for efficiently utilizing telecommunications lines.

DESCRIPTION OF THE RELATED ART

A switch, such as a central office, is used to route communications between remote locations within a telecommunications network. The communications may be voice calls or may be data transfers between two computer networks. Connectivity between the central office and a voice or data terminal is established using wired or wireless telecommunications lines, such as trunk lines. Trunk lines may be used to handle multiple communications simultaneously.

A private branch exchange (PBX) is a smaller scale switch for routing voice and data communications. The PBX is typically dedicated to the private entity that owns the PBX. The lines connecting a PBX to the private entity's users are known as PBX station lines and are owned or leased by the private entity. The PBX station lines may be connected to telephones or data systems, such as computers. PBXs are typically connected to public telephone networks via trunk lines.

All telecommunications lines have limited capacity, i.e., bandwidth. For example, trunk lines that connect central offices and PBXs have a finite number of individual channels to deliver data, whether the data are in the form of voice conversation or computer data. Telecommunications networks are typically designed to handle the maximum data traffic anticipated at any period of time. Maximum demand on telecommunications systems usually occurs during business hours, typically Monday through Friday, 8 a.m.–5:00 p.m. Low demand on telecommunications networks usually occurs during nights and weekends. To manage the imbalance of telecommunications demand, pricing structures have been developed that vary with demand. During peak periods, costs for using a telecommunications network are typically higher than in off-peak periods. For a large business that has heavy phone usage, the cumulative cost differential can be substantial.

In response to the cost differential, large volume users have taken different approaches to cost reduction. For example, some businesses gain lower cost access to telecommunications networks by prepaying or leasing trunk lines. In another example, businesses send large amounts of less important data over telecommunications networks during lower cost times of the day.

For a business that makes a large volume of calls between two sites, a leased communications line can save money. A leased communications line is a permanent connection, twenty-four hours a day between two sites. The user is typically charged a fixed monthly rate for unlimited use. The rate is the same whether or not the leased communications line is used.

Prior art techniques for transmitting data over a telecommunications network, whether leased or not, include immediate transmission, fixed-time transmission, and/or a priority transmission approach. In an immediate transmission approach, data are transmitted immediately regardless of the time of day or the type of data. Voice communications, i.e. phone calls, are always transmitted immediately. To save money, telephone calls can be planned for low cost times but once initiated transmission is always immediate. Electronic data may also be transmitted immediately. For example, an email message sent from a first user in City A is transmitted immediately to a second user in City B.

A fixed-time transmission approach only works for electronic data transfers. In a fixed-time transmission approach, the email message from above would be scheduled for transmission at a specified time. The fixed-time is typically during a low cost time of day. For example, if the first user in City A prepares an email message at 9:00 a.m., the first user can program the business's PBX to transmit the email message at a known low rate time to the second user in City B. If the low telecommunications rates start at 6:00 p.m., the message transmission time can be fixed at 6:00 p.m., thereby lowering transmission cost. This can be particularly advantageous if large amounts of data are transferred.

A priority level transmission approach assigns priorities to electronic data transfers. Electronic data are characterized by the user or business as, for example, low priority and high priority. High priority electronic data are transmitted immediately to the intended destination, similar to a telephone conversation. Low priority electronic data are scheduled for low cost transmission such as fixed-time transmission. A PBX system can be used to implement all of these transmission approaches.

Businesses typically use some combination of the above transmission approaches to handle voice and electronic data transfer. While the approaches work well for the intended purposes, there are concerns. For example, businesses with leased lines may not be fully utilizing the lines at all times during high traffic business hours, but to ensure that there is always sufficient capacity on the leased lines, a fixed-time transmission system is used for electronic data. As a result, electronic data are transmitted only at a fixed time during non-business hours, regardless of the utilization on the leased line during normal business hours. This may unnecessarily leave unused capacity on the leased line during the normally high demand business hours.

Some businesses that do not have leased lines may be using a fixed-time transmission approach to take advantage of lower costs. However, there may be low cost lines that are available during typically high cost business hours. The static fixed-time transmission approach does not allow businesses to take advantage of such availability.

In another example, if a business implements fixed-time transmission of electronic data to conserve capacity on its leased line during high demand times, the company may accumulate a large amount of electronic data scheduled for simultaneous transmission at a specified time. In this situation, the lines may encounter unacceptably high traffic as the fixed-time transmissions begin. This creates a high data traffic demand during usually low demand time periods. This may occur even though there are leased trunk lines that are not fully utilized during the normally high demand business hours.

What is needed is a method and system for efficiently utilizing communication lines, especially telecommunications trunk lines.

SUMMARY OF THE INVENTION

A method and system for utilizing communications lines include establishing a connection between a messaging system and a communications switch, with the messaging system having the ability to store files of data for transmission via the communications switch and the communications lines. The communications switch controls the flow of data files to the communications lines. Data traffic through the communications lines is monitored and the data traffic level is compared to an established data traffic threshold. Data files are transmitted from the messaging system to the communications lines if the measured data traffic level is below the data traffic threshold.

In one embodiment, the method is employed to efficiently utilize a leased telecommunications trunk line. The trunk line is leased by a business and connected to the business's switch, such as a PBX. The PBX acts as a communications switch between an internal telephone system and at least one computer network server. The computer network server contains data files that ray include email, voicemail, fax, and/or video data. Both the telephone system and the server compete to use the limited number of communications channels that are available on the leased telecommunications trunk line. To avoid overcrowding of data traffic on the telecommunications trunk line, some server files may be scheduled for delivery to a desired destination during non-business hours. However, there are times during business hours when data traffic on the trunk line is sufficiently low to allow the transmission of data files without creating data traffic overcrowding. To accomplish efficient utilization of the trunk line, the business establishes a data traffic threshold that represents the maximum number of channels that can be occupied at any one time and not jeopardize more important communications. The data traffic on the trunk line is then monitored and the data traffic level is compared to the data traffic threshold. If the measured data traffic level is below the threshold, the PBX notifies the server that files such as email and voicemail data can be transmitted immediately to the desired destination, instead of waiting until non-business hours.

In another embodiment, a business does not have a leased line but may have limited access to a low cost trunk line during business hours. Instead of waiting to send data files such as email until non-business hours when low cost telecommunications lines are more readily available, the business monitors the low cost lines that have limited availability during business hours. If a low cost line becomes available during business hours, the line is utilized as long as the data traffic level is below the established data traffic threshold.

DETAILED DESCRIPTION

In the preferred embodiment, the invention is practiced in a multimedia data communications network. This network includes a messaging system, a communications switch, and a communication medium.

Figure 1:
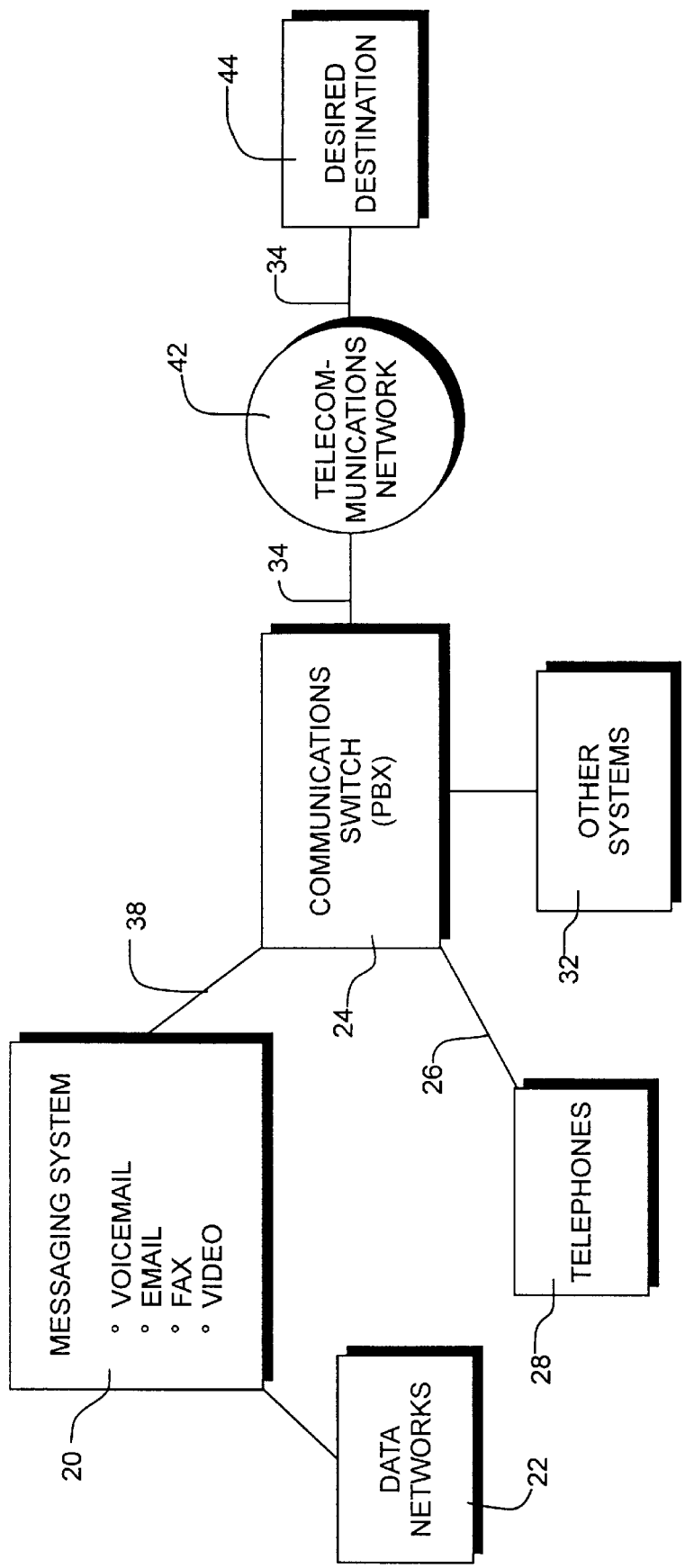
FIG. 1 is a block diagram of a multimedia data network in accordance with the invention.

Referring to FIG. 1, the messaging system 20 is any system that can store and transmit electronic data to another system that is capable of receiving the electronic data. Typically, the messaging system is a computer network server. The system may also be a corporate mainframe computer or a personal desktop computer. The messaging system can also be a combination of multiple messaging systems. The electronic data, or data files, that the messaging system provides may have a single format, but can be in different formats. The data file formats include, but are not limited to, email data, voicemail data, fax data, and video data. Electronic data may include multiple files that range in size.

The communications switch 24 is any device that can manage electronic data traffic in a communications network. Typically, the communications switch is a telephone company central office switch, a private branch exchange (PBX), or some other computer switch. A central office switch is located at a central office of a telephone service provider. The central office switch is a device that routes communications to different parties in the public telecommunications network. A PBX is a private switch that operates similar to the central office switch. The PBX functions to manage calls in a private network of phones, such as in a multiple employee business environment. The PBX also provides an interface between an internal phone network and a public telecommunications network. The PBX is typically connected to communications trunk lines that are connected to a public telecommunications network. Other switches that may be used include computer switches that are traditionally used in computer networks.

Data traffic in a data communication network is monitored with a monitoring system. The monitoring system may reside in a PBX or a central office, or it may be a separate system, such as the adjunct system 32 in FIG. 1. The monitoring system may consist of a combination of software and hardware that measures usage of a communications line such as a telecommunications trunk line. Typically, the monitoring of trunk line availability is performed by a PBX.

The communications medium between the communications switch and the desired destination 44 can be hardwired or wireless or a combination of both. The communications medium is able to carry multiple data communications simultaneously. A hardwired medium can consist of multiple communications lines or a single communication line with multiple channels. Moreover, a wireless communications medium may have multiple communications frequencies or a single frequency that can carry different data. For purposes of the disclosure, "communications lines" are any single line or group of lines that have the ability to carry multiple data communications simultaneously. In the invention, the most common example is a telecommunications trunk line 34.

FIG. 1 is a depiction of the system arrangement in the preferred embodiment. A messaging system 20 serves as a gateway for electronic data that are to be transmitted over a telecommunications network 42 to a desired destination 44. The telecommunications network can be made up of a series of telecommunications switches such as central offices, tandem offices, and toll offices. The messaging system may be the generation point for electronic data or it may be a collection point for data that are generated from other data networks 22 that are connected to the messaging system. The other data networks may be, for example, a local area network of personal computers or other network servers.

The messaging system 20 is connected to a PBX 24 by a network connection 38. The network connection can include any conventional combination of software and hardware that will allow the messaging system and the PBX to transfer data. There may also be telephones 28 connected to the PBX by station lines 26. The number of telephones attached to the PBX can vary, but a PBX can accommodate thousands of telephones if necessary. There may also be other systems 32 connected to the PBX. The other systems may be computer systems, building alarm connections, or other unspecified systems.

The communications medium that connects the PBX 24 to the desired destination 44 is a hardwired trunk line 34 that utilizes a telecommunications network 42. The trunk line can support multiple data communications simultaneously. In this embodiment, the trunk line is leased by a business as a way to reduce telecommunications cost. By leasing the trunk line, the business pays a fixed cost for a fixed number of communications lines. The business pays the same rate for the lines whether they are in use or not. Thus, the cost of a particular communication typically does not vary with the time of day.

Figure 2:
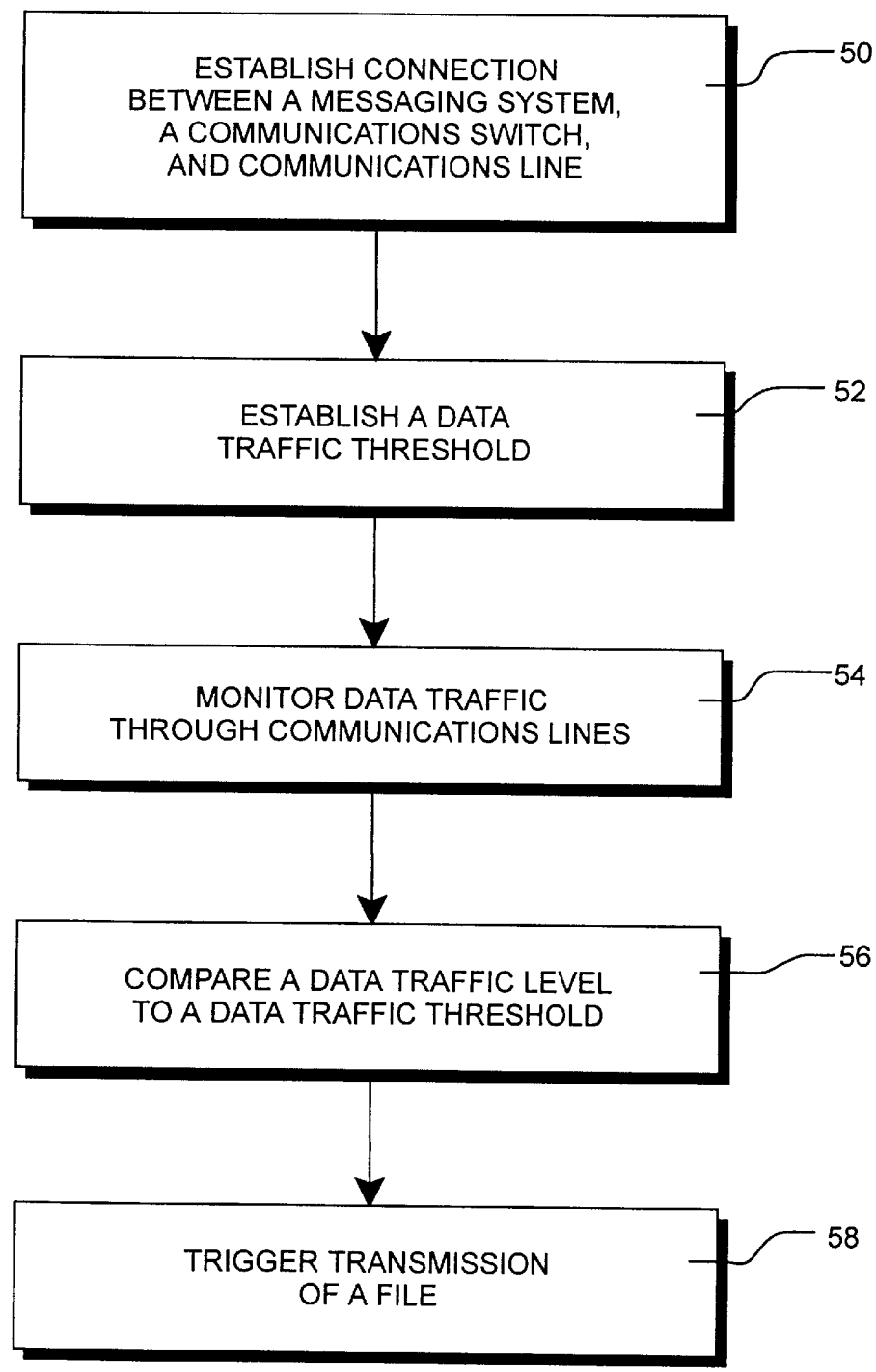
FIG. 2 is a process flow of a trunk utilization method for utilizing the network of FIG. 1 in accordance with the invention.

The operation of the invention is discussed with reference to the preferred embodiment as depicted in FIGS. 1 and 2. In the preferred embodiment, a connection is established 50 between the messaging system 20, the communications switch 24, and the communications trunk line 34. It is assumed that there are files of electronic data in the messaging system 20 awaiting transmission to the desired destination 44 via the leased communications trunk line 34 and the communications switch 24. The data files are assumed to be files that are either scheduled for a fixed-time transmission or scheduled for low priority transmission. In order to efficiently utilize the leased communications trunk line 34 that is available, an awaiting data file is transmitted as soon as specified parameters are met, instead of waiting for a designated fixed-time or low cost line.

Establishing a data traffic threshold 52 is the next step shown in FIG. 2. A data traffic threshold in the preferred embodiment is a traffic level selected by a user as the preferred maximum number or percentage of communications lines that are to be in use at any one time. For example, a business may have a leased trunk line with a capacity for transmitting or receiving 200 separate voice and/or data communications simultaneously. In order to have an adequate number of lines available for customer inquiries, it may be determined that file transfers should not occur if there are 160 lines in use at one time. Therefore, the data traffic threshold is 160 lines, or 80% of the total lines. If 140 lines are available, the traffic is below the traffic threshold and in essence the business has excess communications lines available. On the other hand, if 180 lines are in use, then traffic is above the traffic threshold and important communications may be missed if the remaining 20 lines are occupied suddenly.

In the alternative, the data traffic threshold could be a measure of the minimum number or percentage of communications lines that a user wants to have available at any one time for receiving data transmissions from outside or for transmitting data. In the example above, it was determined that at least 40 lines should be available to accept customer inquiries. The data traffic threshold is therefore 40 lines, or 20% of the total lines available. If 75 lines are available, then traffic is above the traffic threshold and in essence the business has excess communications line capacity. On the other hand, if there are only 15 lines available then traffic is below the threshold and the business may have the potential to miss important communications if the remaining 15 lines are suddenly occupied. Although the preferred embodiment does not use the minimum availability approach, the difference between the two traffic thresholds is in terminology only.

Many factors go into determining what the traffic threshold for a particular business should be. Moreover, the ideal traffic threshold may vary throughout a day and may vary by the day of the week. For example, a customer service center for a business supply service may receive more calls during business hours Monday through Friday, while a home shopping service may receive more calls during the weekday evenings and weekends. As well, a business may have high traffic demand in the morning and low traffic demand during the lunch hour. All of the different traffic patterns may affect the traffic threshold. In the invention, the business may use projections or historical data to establish the appropriate traffic threshold. A dynamic traffic threshold that varies during the day or from day-to-day may also be established.

In another embodiment, the traffic threshold can be calculated continuously by an algorithm that is developed to incorporate past trunk line usage data. In this manner, the traffic threshold can be continuously updated to meet changing traffic patterns.

Once a traffic threshold is established, data traffic on the trunk line is monitored 54 by a monitoring system. Data traffic is a measure of the utilization of a particular trunk line. In the preferred embodiment, traffic monitoring is integrated into the PBX. The PBX monitors the number and percentage of lines that are in use. The PBX can monitor the number and percentage of lines that are available, as an alternative. The frequency of data traffic monitoring can vary depending on need. In the preferred embodiment, the monitoring is essentially continuous. The data generated from data traffic monitoring can be output to various different systems.

To accomplish efficient use of the communications trunk lines, the measured number of in-use lines, or actual traffic, is compared 56 to the established traffic threshold. In the preferred embodiment, the comparison process takes place through electronics and software located in the PBX. If the measured number of in-use lines is less than, or below, the traffic threshold, then there are excess lines available. The messaging system is then triggered 58 by the communications switch to deliver awaiting electronic data files to the communications trunk line via the communications switch. Typically, the entire quantity of awaiting electronic data are transmitted. However, the communications switch can be configured to allow only certain amounts of data to be transmitted. The amount of data to be transmitted can be time based, for example ten minutes of data, or the amount of data to be transmitted can be quantity based, for example one megabyte of data. The amount of data transmitted can also be a function of trunk line capacity that is anticipated to be available based on past traffic patterns. The result is that data that would have been transmitted later at a fixed-time or later as a low priority communication are transmitted sooner, utilizing capacity on a trunk line that otherwise would have gone unused.

The messaging system can also be programmed to notify the communications switch that the messaging system has data that are awaiting transmission. The messaging system can notify the communications switch of the amount of data that is awaiting transmission or of the estimated time that is needed for transmission. The communications switch can use the information to integrate transmission of the awaiting data into the existing data traffic pattern.

On the other hand, if the measured number of in-use lines is greater than the traffic threshold, the communications switch will not allow the transmission of data from the messaging system. This ensures that the communications trunk line is not tied up with data that could wait for later transmission. Moreover, this ensures that more important communications are not jeopardized.

In another embodiment of the invention, historical data are used to determine when a trunk line is likely to be available. In this embodiment, the communications switch notifies the messaging system when there is likely to be a data transmission window. The messaging system then prepares data for transmission at the specified time. When the time of likely availability arrives, data traffic on the trunk line still must be below the traffic threshold.

In another embodiment of the invention, the trunk line 34 of FIG. 1 is not a leased line. Instead, the trunk line 34 represents a low cost communications line that has limited availability for a business during normal business hours. The business has access to low cost communications lines during non-business hours, but could utilize the low cost communications lines 34 that may be available during normal business hours. In this embodiment, the traffic threshold determination could be similar to the traffic threshold determination described above in that the business may want to leave some low cost lines available for other communications. Or, the traffic threshold may be established such that if one low cost communications line is available, then it will be utilized for fixed-time or low priority data transmission.

In operation, the monitoring system monitors data traffic on the low cost trunk line looking for available channels. The measured data traffic level is continuously compared to the traffic threshold. Whenever the data traffic drops below the traffic threshold, the messaging system is notified and awaiting fixed-time transmission data or low priority data are transmitted. The result of this embodiment is that fixed-time transmission data or low priority data are transmitted earlier than they would have been transmitted and are still transmitted at a reasonable cost to the business.

Figure 3:
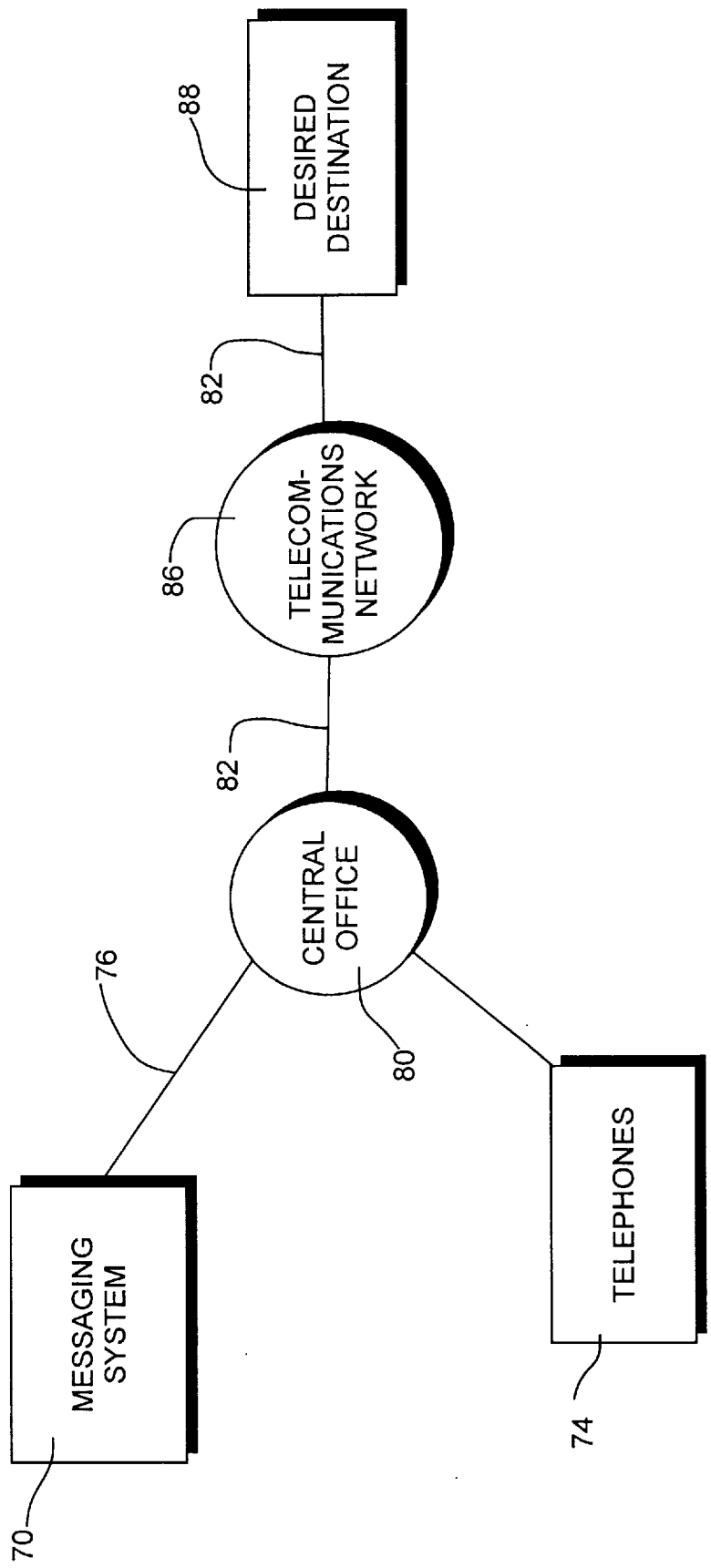
FIG. 3 is a block diagram of a multimedia data network having a central office as the communications switch in accordance with the invention.

FIG. 3 is a depiction of another embodiment of the system arrangement. In this embodiment, a messaging system 70 is directly connected to a central office 80 by a communications line 76. There are also multiple telephones 74 connected to the central office 80. The central office 80 is connected to a desired destination 88 by a multiple channel trunk line 82 that utilizes a telecommunications network 86 for data transmission.

Operation of the embodiment in FIG. 3 is basically the same as the system in FIG. 1. The difference is that the central office 80 monitors data traffic on the trunk line 82 instead of a PBX monitoring the data traffic. The telecommunications network 86 may include a series of telecommunications switches such as central offices, tandem offices, and toll offices.

What is claimed is:

1. A method for utilizing a plurality of communications lines comprising the steps of:

establishing a connection between a messaging system and a communications switch, said messaging system having memory for storing files of data intended for transmission via said communications switch and through said communications lines, said communications switch being connected to said communications lines for controlling data traffic through said communications lines;

establishing a data traffic threshold indicative of a preselected availability level for additional traffic along said communications lines, said data traffic threshold being representative of a condition to be met before said files of data from said messaging system are transmitted;

monitoring said data traffic through said communications lines to determine a data traffic level;

comparing said data traffic level on said communications lines to said data traffic threshold, including identifying times during which said data traffic level is below said data traffic threshold;

triggering transmission of a file stored in said memory in response to detection that said data traffic level is below said data traffic threshold; and leaving unused communications lines available for data transmissions from sources other than said memory of said messaging system when said data traffic level is above said data traffic threshold.

2. The method of claim 1 wherein said step of establishing said data traffic threshold includes identifying a minimum number of communications lines that must be available before said files of data from said messaging system are transmitted.

3. The method of claim 1 further comprising the step of establishing a data traffic threshold that is adjusted in response to data traffic patterns on said communications lines.

4. The method of claim 1 wherein said step of triggering transmission of a file includes notifying said messaging system that data can be transmitted.

5. The method of claim 4 wherein said step of notifying said messaging system that a file can be transmitted includes notifying said messaging system of an amount of files that can be transmitted.

6. The method of claim 1 further comprising the step of notifying said communications switch that said messaging system has data awaiting transmission.

7. The method of claim 6 wherein said step of notifying said communications switch that said messaging system has files awaiting transmission includes notifying said communications switch of an amount of files awaiting transmission.

8. The method of claim 1 further including the step of creating data traffic patterns to predict when said data traffic is likely to be below said data traffic threshold.

9. The method of claim 1 wherein said step of establishing a connection between a messaging system and a communications switch includes establishing a connection between a messaging system and one of a private branch exchange or a central office and wherein said communications lines constitute a telecommunications trunk line.

10. The method of claim 1 wherein said step of triggering transmission of a file is a step of transmitting one of email data, voice mail data, fax data, or video data.

11. A system for allocating a plurality of communications lines comprising:

a communications switch connected to said communications lines for controlling electronic data traffic through said communications lines;

a messaging system in message-transfer communication with said communications switch, said messaging system having memory for storing electronic data files intended for transmission via said communications lines;

monitor means, connected to said communications switch, for measuring electronic data traffic through said communications lines; and dynamic communications allocation means, connected to said communications switch, for triggering transmission of said electronic data files from said messaging system through said communications lines via said communications switch upon detecting that a preselected electronic data traffic threshold exceeds measured electronic data traffic as measured by said monitor means, said electronic data traffic threshold being representative of a level of availability of said communications lines for transmitting said electronic data files stored in said memory of said messaging system, said electronic data traffic threshold being adjustable.

12. The system of claim 11 further comprising a threshold memory wherein said threshold memory stores said electronic data traffic threshold, wherein said electronic data traffic threshold represents the maximum number of communications lines that can be in use before one of said electronic data files from said messaging system is transmitted.

13. The system of claim 11 wherein said messaging system is a computer network server and wherein said electronic data files stored on said computer network server are one of email data, voice mail data, fax data, or video data.

14. The system of claim 11 wherein said dynamic communications allocation means uses historical traffic data to determine when data transmission is likely to be available.

15. The system of claim 11 wherein said communications lines are part of a telecommunications trunk line.

16. A method for allocating a plurality of channels on a telecommunications trunk line comprising the steps of:

establishing a connection between a messaging system and a communications switch, said messaging system having memory for storing files of data intended for transmission via said communications switch and through said telecommunications trunk line, said communications switch being connected to said telecommunications trunk line for controlling data traffic through said telecommunications trunk line;

establishing a data traffic threshold that represents the maximum number of channels that can be in use on said telecommunications trunk line before said files from said messaging system are transmitted;

monitoring said data traffic through said telecommunications trunk line to determine a data traffic level;

comparing said data traffic level on said telecommunications trunk line to said data traffic threshold;

triggering transmission of a file stored in said memory in response to detection that said data traffic level is below said data traffic threshold; and leaving unused channels available for system data from sources other than said messaging system when said data traffic is above said data traffic threshold.

17. The method of claim 16 further comprising the step of establishing a data traffic threshold that is adjusted in response to said data traffic level on said telecommunications trunk line.

18. The method of claim 16 further including the step of creating data traffic patterns to predict when said data traffic is likely to be below said data traffic threshold.

* * * * *